(12) United States Patent
Tsym

(10) Patent No.: US 10,609,096 B2
(45) Date of Patent: *Mar. 31, 2020

(54) METHOD AND SYSTEM FOR DISPATCHING RECEIVED SESSIONS BETWEEN A PLURALITY OF INSTANCES OF AN APPLICATION USING THE SAME IP PORT

(71) Applicant: Polycom, Inc., San Jose, CA (US)

(72) Inventor: Kirill Tsym, Modiin (IL)

(73) Assignee: Polycom, Inc., San Jose, CA (US)

( * ) Notice: Subject to any disclaimer, the term of this patent is extended or adjusted under 35 U.S.C. 154(b) by 113 days.

This patent is subject to a terminal disclaimer.

(21) Appl. No.: 15/962,666

(22) Filed: Apr. 25, 2018

(65) Prior Publication Data

US 2018/0248921 A1    Aug. 30, 2018

Related U.S. Application Data

(63) Continuation of application No. 15/193,873, filed on Jun. 27, 2016, now Pat. No. 9,992,247, which is a
(Continued)

(51) Int. Cl.
*H04L 29/06* (2006.01)
*H04L 29/08* (2006.01)
*H04L 12/803* (2013.01)

(52) U.S. Cl.
CPC .......... *H04L 65/403* (2013.01); *H04L 47/125* (2013.01); *H04L 65/1006* (2013.01);
(Continued)

(58) Field of Classification Search
CPC .............. H04L 47/125; H04L 67/1008; H04L 67/1031
See application file for complete search history.

(56) References Cited

U.S. PATENT DOCUMENTS 6,363,081 B1    3/2002    Gase
6,745,228 B2    6/2004    Riddle
(Continued)

FOREIGN PATENT DOCUMENTS

JP        10320220        12/1998
WO    WO20080033706    3/2008

OTHER PUBLICATIONS

Wikipedia, the free encyclopedia, "inetd", 5 pages.
(Continued)

*Primary Examiner* — Bryan Lee
(74) *Attorney, Agent, or Firm* — Blank Rome, LLP

(57) ABSTRACT

A logical module, referred as Load Balancer Module (LBM), is disclosed which listens to one of certain common predefined port number. These well-known ports for receiving communication video conference signaling and control protocols is thereafter load balanced and multi-plexed to a number of instances of protocol stack applications. By balancing the multi-media data stream across a multitude of application instances multiple multi-media data streams may be serviced and processed by a single internet protocol host processor. A mutipoint control unit (MCU) may therefore process multiple input data streams containing multi-media video conferencing information.

20 Claims, 8 Drawing Sheets

Related U.S. Application Data continuation of application No. 14/459,987, filed on Aug. 14, 2014, now Pat. No. 9,379,984, which is a continuation of application No. 12/357,001, filed on Jan. 21, 2009, now Pat. No. 8,849,972.

(60) Provisional application No. 61/117,619, filed on Nov. 25, 2008.

(52) U.S. Cl.
CPC ...... *H04L 65/1009* (2013.01); *H04L 65/1083* (2013.01); *H04L 65/80* (2013.01); *H04L 67/1002* (2013.01); *H04L 67/1008* (2013.01); *H04L 67/1014* (2013.01); *H04L 67/1029* (2013.01); *H04L 67/1031* (2013.01); *H04L 67/141* (2013.01)

(56) References Cited

U.S. PATENT DOCUMENTS

| | | | |
|---|---|---|---|
| 7,376,129 | B2* | 5/2008 | Acharya ........... H04L 29/06027 370/352 |
| 2002/0065919 | A1 | 5/2002 | Taylor et al. |
| 2004/0186918 | A1* | 9/2004 | Lonnfors ................ H04L 69/22 709/250 |
| 2005/0038801 | A1 | 2/2005 | Colrain et al. |
| 2005/0050202 | A1 | 3/2005 | Aiken et al. |
| 2005/0276281 | A1* | 12/2005 | Jones ...................... H04L 69/16 370/469 |
| 2007/0061434 | A1 | 3/2007 | Schmeider et al. |
| 2008/0119165 | A1 | 5/2008 | Mittal et al. |
| 2008/0249782 | A1 | 10/2008 | Ativanichayaphong et al. |
| 2009/0077326 | A1 | 3/2009 | Motohashi |

OTHER PUBLICATIONS

Wikipedia, the free encyclopedia, "Super-Server", 2 pages.
Japanese Office Action issued in corresponding Japanese Application No. 2009-265736 dated Mar. 6, 2012 (including English translation).

* cited by examiner

METHOD AND SYSTEM FOR DISPATCHING RECEIVED SESSIONS BETWEEN A PLURALITY OF INSTANCES OF AN APPLICATION USING THE SAME IP PORT

RELATED APPLICATION DATA

This Application is a continuation of Ser. No. 15/193,873 filed Jun. 27, 2016, which is a continuation of U.S. patent application Ser. No. 14/459,987 filed Aug. 14, 2014 now U.S. Pat. No. 9,379,984, which is a continuation of U.S. patent application Ser. No. 12/357,001 filed Jan. 21, 2009 now U.S. Pat. No. 8,849,972, which claims priority to U.S. Provisional Patent Application Ser. No. 61/117,619 filed 25 Nov. 2008, each of which is entirely incorporated by reference herein.

FIELD OF THE INVENTION

The subject matter of the present disclosure relates to the field of multiple application programs running on the same IP host and communicating simultaneously over the Internet, and more specifically to the need of system and method to enable multiple instances of the same application program to listen on the same IP port simultaneously.

BACKGROUND

As the network traffic continues its rapid growth and more and more developers introduce network products and solutions, there is an increasing number of application programs (processes) that use a predefined well-known network port. Some of these application programs need to listen on a single well-known predefined Transmission Control Protocol (TCP) and\or Transport Layer Security (TLS) and/or User Datagram Protocol (UDP) port number, for example. Session Initiation Protocol (SIP) and H.323 Protocol are examples of such application programs (processes) that need to listen on such a well-known TCP or UDP port number. H.323 Protocol application programs listen on TCP port number 1720, while SIP application can listen to TCP or UDP port number 5060, or over port 5061 for encrypted video and/or audio conferencing session based on TLS/TCP transport protocol, for example. In a common architecture of videoconferencing networks, SIP clients are connected via a SIP proxy to a Multipoint Control Unit (MCU). The transport protocol between the SIP proxy and the MCU can be configured by an administrator. There are some cases in which more than one transport protocol can be used between the proxy and the MCU.

Different types of network devices may be able to achieve better scalability, robustness and load balancing if they have the ability for two or more instances of an application program (process) to run simultaneously using the same specific port number. An example of such a network device is an MCU. An MCU is a conference controlling entity located in a node of a network or in a terminal. An MCU receives and processes, according to certain criteria, a plurality of media, signaling, and control channels from access ports and distributes these to connected channels. Examples of MCUs include the MGC-100, and RMX 2000 (Polycom Inc.). MCUs can be composed of two logical units: a media controller (MC) and a media processor (MP). A more thorough definition of an endpoint (terminal) and an MCU can be found in the International Telecommunication Union ("ITU") standards, such as but not limited to the H.320, H.324, and H.323 standards. The MCU is required to handle a plurality of sessions between a plurality of users (clients) simultaneously. Thus, MCU may require using simultaneously more than one instance of the same application program, H.323 for example, for the different sessions. Unfortunately the Operating System (OS) has a port listening limitation in that only a single application/application instance (process) can listen on a specific port number on the same IP host. In this disclosure the terms application, application program and process may be used interchangeably.

H.323 is an International Telecommunications Union (ITU) standard that provides specification for computers, equipment, and services for multimedia communication over packet based networks that defines how real-time audio, video and data information is transmitted. H.323 is commonly used in VoIP, Internet Telephony, and IP-based videoconferencing. Users can connect with other users over the Internet and use varying products that support H.323. This standard includes the Internet Engineering Task Force (IETF) Real-Time Protocol (RTP) and Real-Time Control Protocol (RTCP), with additional protocols for call signaling, and, data and audiovisual communications.

IETF SIP is an application-layer control protocol, a signaling protocol for Internet Telephony. SIP can establish sessions for features such as audio/videoconferencing, interactive gaming, and call forwarding to be deployed over IP networks, thus enabling service providers to integrate basic IP telephony services with Internet, e-mail, and chat services. In addition to user authentication, redirect, and registration services, SIP Server supports traditional telephony features such as personal mobility, routing, and call forwarding based on the geographical location of the person being called.

There are techniques that provide the ability for an application program to listen for incoming calls on multiple ports. But such a system requires adding in the Operating System (OS) transport components and Network components (not always possible). Such system also may require predefining strings that a user (client) will need to transmit in order to connect to that application. A user (client) that does not know the predefined string will not be able to refer and connect to such an application program. Furthermore, such system will not enable a plurality of instances of the same application to listen on the same port. Other techniques provide the ability to dispatch connection services (multiple different application instances) to listen on a single static port. Those methods require predefining a unique ID for each application/instance and notifying the clients of these unique IDs or else the clients will not be served. In this disclosure the terms user and client may be used interchangeably Therefore, there is a need in the art for a method and a system that will enable multiple application instances to operate simultaneously using the same listening port. It is desirable that such a method and system would not require that clients be informed of a predefined unique ID or special strings to be served. It is also desirable that no changes in the OS level would be required.

SUMMARY

The above-described needs are met using the disclosed methods and apparatus\systems that enable multiple application instances to use the same listening port simultaneously using a load-balancing scheme. The method and apparatus do not require any changes in the Operating System.

A logical module, referred as Load Balancer Module (LBM), listens to a certain common predefined port number. Port number 1720 is a well-known port for receiving communication based on H.323 protocol, for example. An exemplary H.323 LBM can be configured to listen to port number 1720 for receiving H.323 connection requests for all H.323 instances (tasks). Another exemplary LBM can be configured to listen to well-known port number 5060 and/or 5061 for communication based on SIP protocol (SIP LBM). H.323 communication is based on TCP, while SIP communication can be based on TCP, TLS/TCP or UDP. In an exemplary architecture of videoconferencing networks, SIP clients can be connected via a SIP proxy to an MCU implementing exemplary techniques as disclosed herein. The transport protocol between the SIP proxy and the MCU can be configured by an administrator, for example. In some cases more than on transport protocol can be used between the proxy and the MCU.

H.323 LBM is connected to a plurality of instances (tasks) of a H.323 stack. SIP LBM is connected to a plurality instances (tasks) of SIP stack. In one embodiment, the internal connection between each LBM and its associated instances can be via a connection set by the LBM using a file descriptor transferring mechanism, such as but not limited to, Unix Domain Socket, for example. In other embodiments, the connection between the LBM and the instances can be via a shared memory, for example. The connection between the different instances, such as but not limited to SIP and H.323, and the LBM can be established at power on, for example.

An exemplary LBM can request to listen to the relevant port. In response, a listening socket is defined by the OS. Once a request for new TCP connection is received via the relevant port, such as port 1720, the Operating System (OS) transfers the request to H.323 LBM. Thus only the H.323 LBM receives the H.323 connection request. In response for accepting the new TCP connection, a randomly chosen Socket Number is selected by the OS to be associated with the newly received TCP connection. The new socket is transferred to the H.323 LBM. Next, the H.323 LBM can locate an available H.323 instance (task) to handle the call.

An Active-Call Counter for each H.323 instance can assist the H.323 LBM in its decision to which H.323 instance to transfer the call. The Active-Call Counter can be a counter that counts the amount of active calls the specific H.323 instance is handling. The Active-Call Counter is updated each time an active call has been terminated or a new call has been received for that specific instance. H.323 LBM can decide to transfer the new connection request according to the H.323 instance that has the smallest Active-Call Counter value, for example. In some embodiments, if no instance (task) of the application is available, then LBM can initiate one.

H.323 LBM can forward the associated Socket Number using a descriptor sharing mechanism such as but not limited to UNIX Domain Socket, wherein the header indicates that a socket is transferred. In response, the selected instance will receive a new socket number for handling the call via the same IP port for receiving and sending data. According to another exemplary embodiment, in which plug-in Silicon Operating System (pSOS) is used, a sharing socket system call, "shr_socket", can be used as socket sharing mechanism. Additionally, other methods can be used to share the same descriptor by two or more applications.

These and other aspects of the disclosure will be apparent in view of the attached figures and detailed description. The foregoing summary is not intended to summarize each potential embodiment or every aspect of the present disclosure, and other features and advantages of the present disclosure will become apparent upon reading the following detailed description of the embodiments with the accompanying drawings and appended claims.

Furthermore, although specific exemplary embodiments are described in detail to illustrate the inventive concepts to a person skilled in the art, such embodiments are susceptible to various modifications and alternative forms. Accordingly, the figures and written description are not intended to limit the scope of the inventive concepts in any manner.

BRIEF DESCRIPTION OF THE DRAWINGS

Exemplary embodiments of the present disclosure will be understood and appreciated more fully from the following detailed description, taken in conjunction with the drawings in which.

DETAILED DESCRIPTION

Turning now to the figures in which like numerals represent like elements throughout the several views, exemplary embodiments, aspects and features of the disclosed methods, systems, and apparatuses are described. For convenience, only some elements of the same group may be labeled with numerals. The purpose of the drawings is to describe exemplary embodiments and not for limitation. The timing interval between the different events, in the timing diagrams, is not necessarily shown to scale.

Figure 1:
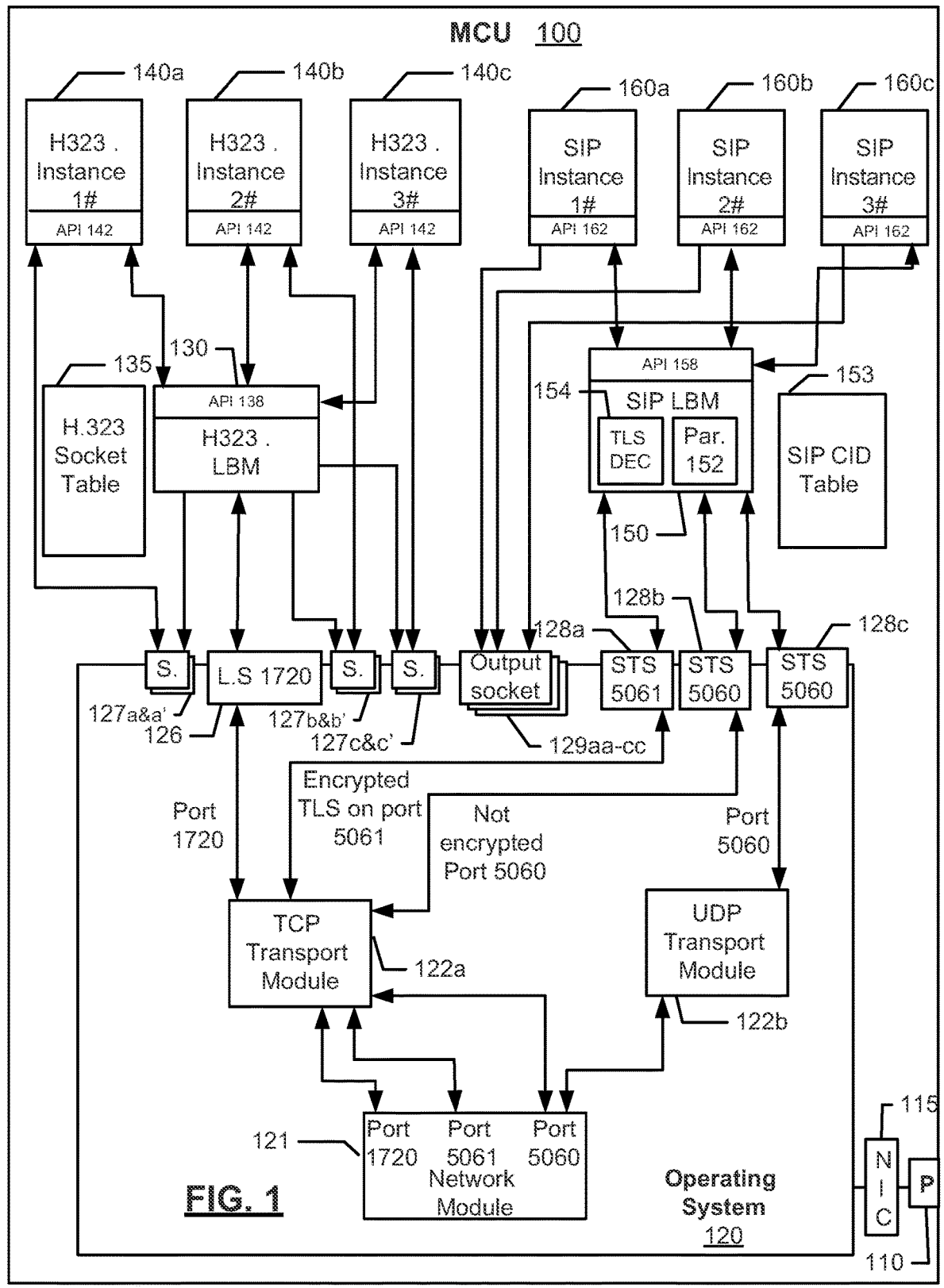
FIG. 1 is a simplified block diagram illustrating a portion of an exemplary MCU.

FIG. 1 is a simplified block diagram illustrating a portion of an exemplary Multipoint Control Unit (MCU) 100. The described portion of MCU 100 comprises and describes relevant elements of an MCU that may handle the control and signaling based on H.323 or SIP. Other sections of a common MCU are not described, sections such as media (audio, video, data) processing, for example. Among other elements, MCU 100 can include: one or more plugs 110, one or more Network Interface Cards 115, and an Operating System 120. At it's application layer, MCU 100 can include: a H.323 Load Balancer Module (LBM) 130, a plurality of H.323 Instances 140a-c, a SIP Load Balancer Module (LBM) 150, and a plurality of SIP Instances 160a-c. It will be appreciated, by those skilled in the art, that depending upon its configuration and the needs of the system, each MCU can have a number other than three instances per each protocol. However, for purposes of simplicity of understanding, three instances per protocol are shown.

MCU 100 can be a network device/application server working on IP network. MCU 100 is only one of many different network devices/application servers that can implement the teachings of the present description.

Plug 110 connects MCU 100 via an appropriate link to a LAN (Local Area Network) based on Ethernet, for example. Network Interface Card 115 processes the OSI's (Open System Interconnection) Physical Layer and Data Link Layer of the communication. Operating System (OS) 120, among other functions, processes the Network layer and Transport Layer of the communication according to the appropriate protocols, IP protocol, TCP, UDP, etc.

OS 120 may include a Network Module 121, a TCP Transport module 122a, and a UDP Transport module 122b. Network Module 121 can include, among other objects, an IP Network Stack for example. Network Module 121 receives its communication from the MC 115 and processes the OSI's Network Layer. Network Module 121 parses the IP header of the packets. The IP header can include, among other things, the destination IP address, destination port number, source IP address, source port number, and the type of the transport protocol. OS 120 randomly defines a socket number 127a-c and\or 129 for the received communication according to the above four parameters: destination IP address, destination port number, source IP address, and source port number. Network Module 121 can transfer the communication to TCP Transport module 122a or to UDP Transport module 122b, according to the protocol mentioned in the header (TCP, or UDP, for example). Over port 1720 TCP communication of H.323 call requests is transferred. Over port 5060 un-encrypted UDP or TCP communication of SIP sessions is transferred. Over port 5061 encrypted TLS communication of SIP sessions is transferred. The used transport protocols for SIP sessions can vary and can be configured by an administrator periodically. In some cases only UDP is used with a port number 5060. In other cases TCP is used with port 5060 or with port 5061 for TLS encrypted sessions. Yet in alternate embodiment, all the three options can be used.

TCP Transport module 122a processes the Transport Layer level of the OSI and can comprise, among other objects, a TCP transport stack. TCP Transport module 122a processes the communication from ports 1720, 5060, and 5061. TCP Transport module 122a can transfer the request for communication either to a H.323 Listening Socket 126 or to a SIP Listening Socket 128a or 128b or 128c, according to the listening port from which the data was received and the used transport protocol, for example.

The UDP Transport module 122b processes the Transport Layer level of the OSI and can comprise, among other elements, a UDP transport stack. UDP Transport module 122b processes communication received from port 5060 and can transfer the request for communication to a Listening Socket 128c. More information on the operation of OS 120 is disclosed below.

The MCU 100 Application Layer can comprise two Load Balancer modules-H.323 LBM 130 and SIP LBM 150. Each Load Balancer includes an API (application programming interface), 138 or 158, to communicate with H.323 Instances 140a-c or with SIP Instances 160a-c, respectively. Exemplary API commands can be add, delete, clear, and so on. Each LBM may request from OS 120, at initiation, a Listening Socket. H.323 LBM 130 may be associated with a Listening socket 126, for TCP communication on port 1720. SIP LBM 150 may be associated with three Listening sockets 128a-c, listening socket 128a for encrypted TLS/TCP communication received via port 5061, listening socket 128b for unencrypted TCP communication received via port 5060, and listening socket 128c for unencrypted UDP communication received via port 5060. The transport protocol between the SIP proxy and the MCU 100 can be configured by an administrator. There are some cases in which more than one transport protocol can be used over the connection between the proxy and the MCU 100.

In another example, three LBMs can be used: one for H.323, one for un-encrypted SIP, and one for encrypted SIP based on TLS protocol. Still alternatively, a single LBM can be used for handling the three types of communication (TCP communication received via port 5060, unencrypted UDP and TCP communication received via port 5060 and encrypted communication based on TLS/TCP received via port 5061).

Each SIP call is associated with a Call-ID. The Call-ID (CID) represents a specific SIP call with a specific SIP client. Therefore SIP LBM 150 may include a Parser 152 that partially parses the communication received to determine the CID and transfer it to the appropriate SIP Instance 160a-c that handles the communication with that client. SIP LBM 150 may also include a Decrypter and TLS stack 154 to decrypt the TLS communication received from TCP Transport module 122a via port 5061 to enable the parsing of the communication and determining the CID.

A plurality of sockets 127a-c and\or 129aa-cc, may be created and terminated to enable communication between different H.323 Instances 140a-c or SIP instances 160a-c and H.323 clients or SIP clients, respectively. As mentioned above, OS 120 randomly defines socket numbers 127a-c and\or 129aa-cc for communication according to four parameters: destination IP address, destination port number, source IP address, and source port number. The socket number used for SIP instances, 129aa-cc, represents the listen socket 128a-c and the instance 160a-c. The first letter represents the listen socket 128a-c and the second letter represents the instance number 160a-c. Accordingly, an exemplary socket 129bc represent listen socket 128b and SIP instance 160c, for example. So there are configurations in which the number of sockets that are used by SIP instances 160a-c is the product of the number of listening sockets (as function of the transport protocols and the ports) and the number of SIP instances. In the example of FIG. 1 it can be nine sockets.

Yet, in another exemplary embodiment, other combinations of transport protocols can be used between MCU 100 and the SIP proxy. Some embodiments may use only TLS/TCP, for example. In such an embodiment, MCU 100 may comprise one transport protocol module, TCP transport module 122a, one listening socket, 128a, and three instance's sockets, 129aa, 129ab & 129ac, for example At the MCU 100 Application Layer, two Socket tables are up-dated with the socket numbers. A H.323 Socket table 135 associated with H.323 communications and a SIP Call-ID (CID) table 153 associated with SIP communications. H.323 Socket table 135 is managed by H.323 LBM 130. SIP CID table 156 is managed by SIP LBM 150. Each entry in the H.323 Socket table 135 includes information that is relevant to an H.323 session, such as but not limited to, an entry ID, an associated socket number 127a-c and an associated H.323 Instance 140a-c allocated to handle the session. Each entry in the SIP CID table 153 comprises information that is relevant to a SIP session, such as but not limited to the CID of the SIP session, an associated SIP Instance 160a-c that was allocated to handle the session and the listening socket 128a-c from which the call is received, etc. The tables are created and managed by the appropriate LBM and are used by the relevant LBM for routing calls to appropriate instances.

Each LBM, H.323 LBM 130 and SIP LBM 150, can include a plurality of Active-Call Counters. H.323 LBM 130 can include an Active-Call Counter for each H.323 Instance 140a-c. The Active-Call Counter is incremented by one for each new incoming call for the specific H.323 Instance 140*a-c* and decremented by one for each active call that terminates at the specific H.323 Instance 140*a-c*. SIP LBM 150 can include an Active-Call Counter for each SIP Instance 160*a-c*, which operates in a similar manner as H.323 Active-Call Counter for the SIP instances 160*a-c*. According to the values of each active call counter the communication load over the instances can be balanced.

An exemplary H.323 instance 140*a-c* can comprise a H.323 stack for handling the H.323 signaling and control communication with the plurality of conferees that have been associated with the relevant instance. In addition each H.323 instance 140*a-c* can include an API module 142 for communicating with the H.323 LBM 130. An exemplary SIP instance 160*a-c* can comprise a SIP stack and an API module 162. The SIP stack handles the SIP signaling and control communication with the plurality of conferees that have been associated with the relevant instance. The API module 162 can communicate with the SIP LBM 150. In exemplary embodiments of SIP instance 160*a-c* in which the communication is encrypted based on TLS/TCP, the exemplary SIP instance 160*a-c* can include a TLS encryptor module. The TLS encryptor can be used to encrypt the SIP signaling and control data before sending it toward the relevant conferee.

Figure 2A:
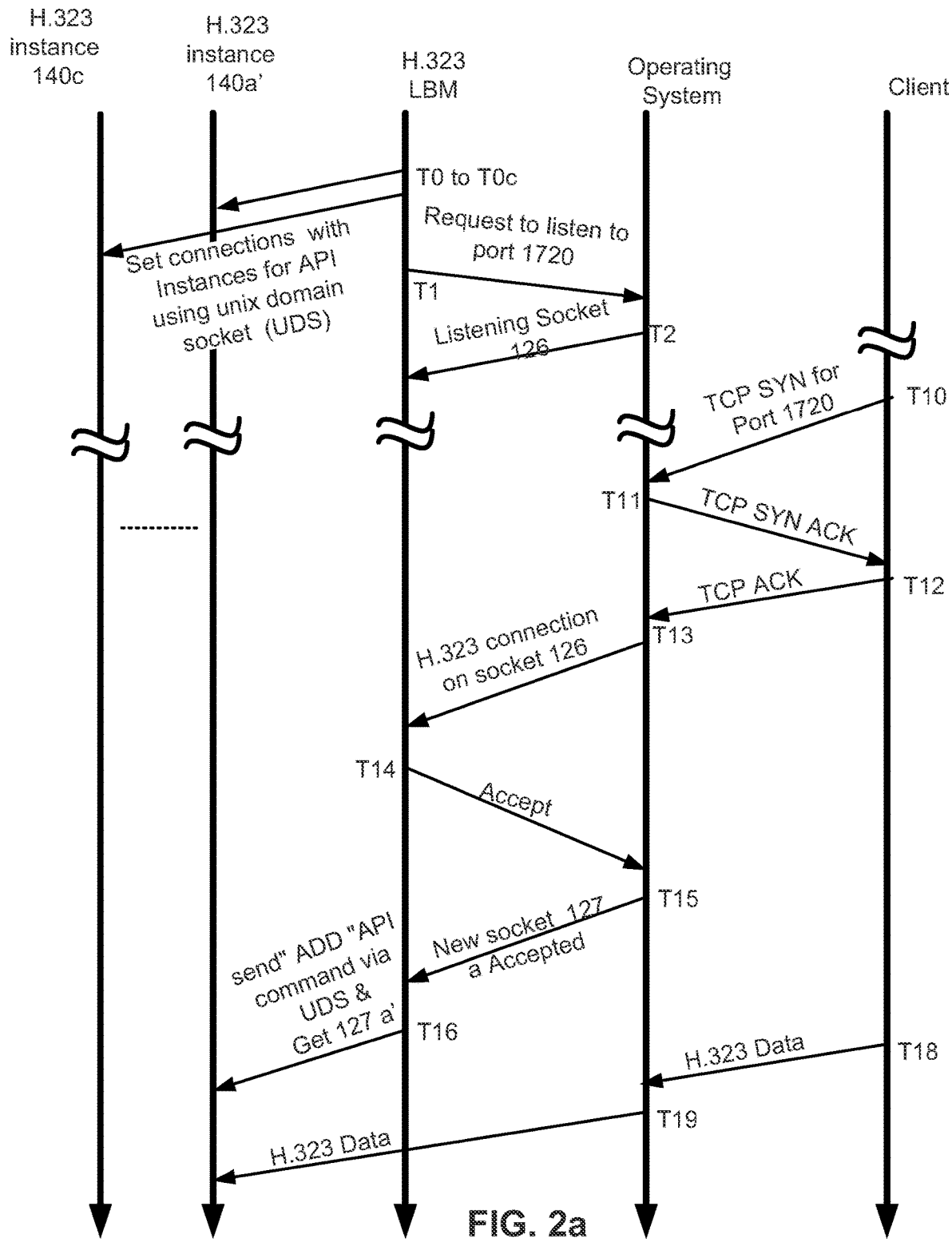
FIG. 2a&b is a time diagram illustrating an exemplary flow of a H.323 call-setup handling over TCP.

FIG. 2*a&b* is a time diagram illustrating relevant events in an exemplary flow of a H.323 call handling over TCP. For convenience and clarity of presentation, only a single call with few events is illustrated. However, a skilled person in the art will appreciate that a plurality of calls with a plurality of events can be handled in a similar way. During initiation T0 to T0*c* H.323 LBM 130 (FIG. 1) establishes connection via Unix Domain Socket (UDS) with each one of the H.323 Instances 140*a-c*. The new connections can be used for carrying the API commands that are transferred between API module 138 and API module 142 (FIG. 1) at each instance. Other exemplary embodiments may use other communication methods between applications, such as but not limited to, a share socket mechanism in pSOS, for example.

At T1, H.323 LBM 130 requests from the OS 120 (FIG. 1) to listen on TCP connection requests received via port 1720. In return, at T2, the OS 120 (FIG. 1) sends a socket number 126 (FIG. 1) to H.323 LBM 130 to serve as the Listening Socket on port 1720. Then, a TCP SYN is received T10 from a client on port 1720 requesting to establish a new TCP connection. OS 120 responds by sending at T11 a TCP SYN ACK (Acknowledge). Once the TCP SYN ACK has been received, the client sends T12 a TCP ACK as an indication request to establish a H.323 communication session.

Next, at T13, OS 120 sends, via listening socket 126 the request to H.323 LBM 130 for setting a H.323 connection with the client. In return, H.323 LBM 130 sends at T14 a H.323 accept-connection. OS 120 returns T15 an accepted with new socket 127*a*, for example, through which the session will be handled. Upon receiving the new socket, LBM can determine which H.323 instance 140*a-c* will handle the call. The selection can be based on the value of the Active-Call Counter associated with each instance. After selecting an instance, the H.323 socket table is updated with the new socket number 127*a*, and the identification of the selected instance 140*a* (FIG. 1), for example.

At T16, H.323 LBM 130 sends an API command to 'ADD' the new session, which is received via socket 127*a*, to the selected H.323 Instance 140*a*. The ADD command is transferred via Unix Domain Socket, wherein the header indicates that a socket is transferred and the socket number 127*a* is transferred as payload. In response, a second socket number, 127*a'*, which can be selected randomly, is delivered to the selected instance 140*a*, for example. Each number, 127*a* and 127*a'*, can be used by different applications (LBM H.323 130 and the selected instance 140*a*, respectively) for accessing the same file descriptor. As a result, a new socket number is allocated for the session 127*a'* on which the selected instance can execute the session. Consequently, a pair of sockets for the session is created (127*a*; 127*a'*). 127*a* is used by the H.323 LBM and 127*a'* is used by the selected instance. The rest of the H.323 session with the client is conducted by the selected H.323 instance 140*a* using the socket number 127*a'*. In a similar way, sockets 127*b* and 127*b'* can be allocated for sessions handled by H.323 instance 140*b* and sockets 127*c* and 127*c'* can be allocated for sessions handled by H.323 instance 140*c*.

At T18, the H.323 client sends H.323 data that can include H.323 call setup information in order to establish the H.323 session. The H.323 data is transferred, at T19, on both sockets 127*a* and 127*a'*. However, only the selected H.323 instance, 140*a* for example, reads the H.323 data and responds to the requests.

Figure 2B:
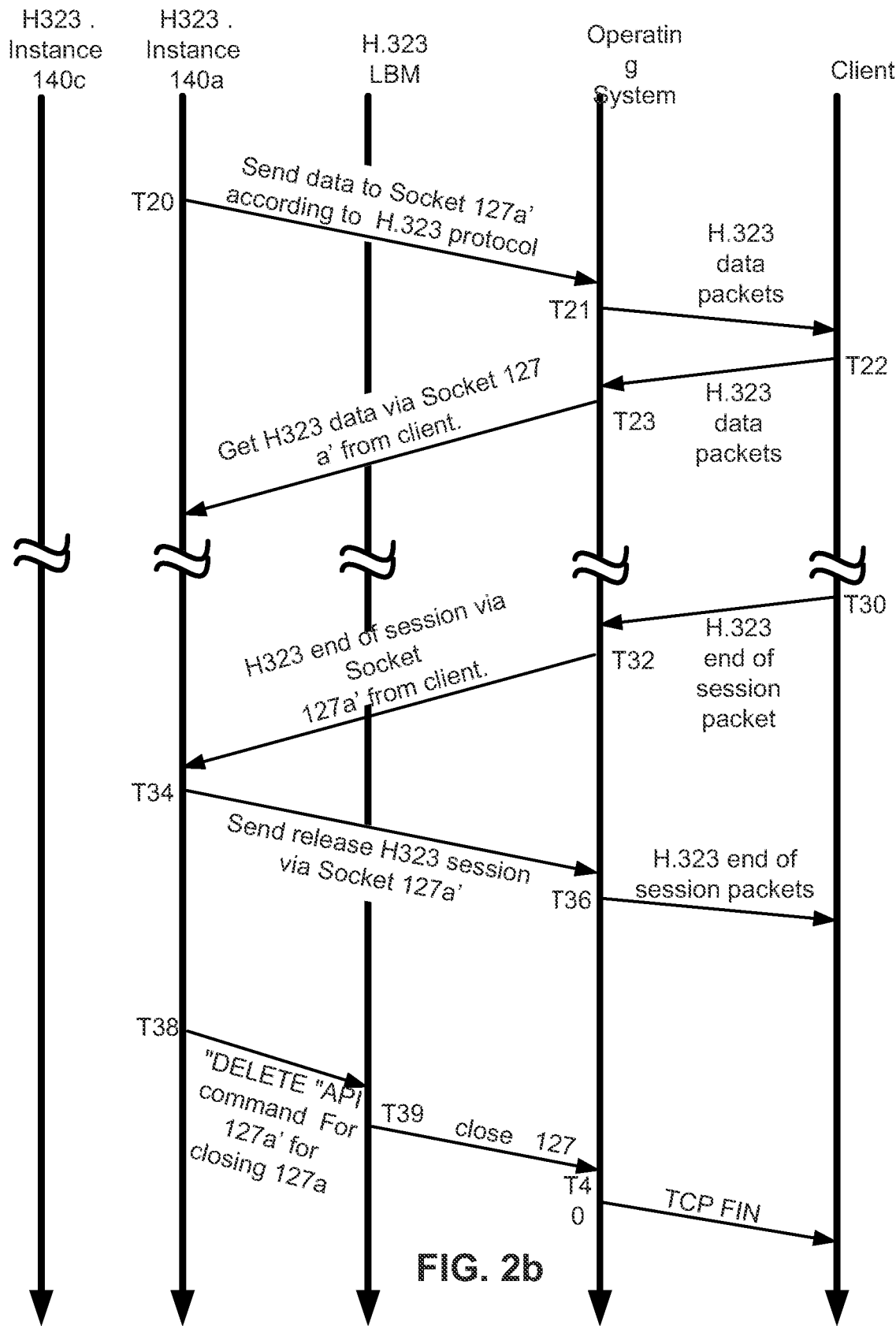

Turning now to FIG. 2*b*, which is the continuation of the timetable of the same H.323 session, at T20, the selected H.323 instance, 140*a* for example, sends H.323 data using the Socket number 127*a'*. At T21, the OS 120 sends the H.323 data toward the client. At T22, the client sends a data (H.323 packet). OS 120 transfers the packet of H.323 data via socket 127*a'* to the selected H.323 instance, at T23 (140*a*). The session can continue via socket 127*a'* until the end of the session.

At the end of the session T30, the client can send an H.323 end of session indication. The end of session indication can be sent at, T32, from the OS 120 (FIG. 1) to the selected instance 140*a* via socket 127*a'*. At T34, a release call indication is sent, via socket 127*a'*, that closes socket 127*a'*. An API command DELETE is sent, at T38 from H.323 instance 140*a* to the H.323 LBM 130 using UDS via the connection that was opened at T0. Once an API DELETE command is received, H.323 LBM 130 sends T39 a close socket 127*a* command to OS 120. OS 120 then sends, at T40 a close TCP connection to the client by using TCP FIN command. It will be appreciated that similar processes can execute simultaneously for other H.323 sessions with other instances using other sockets.

Figure 3A:
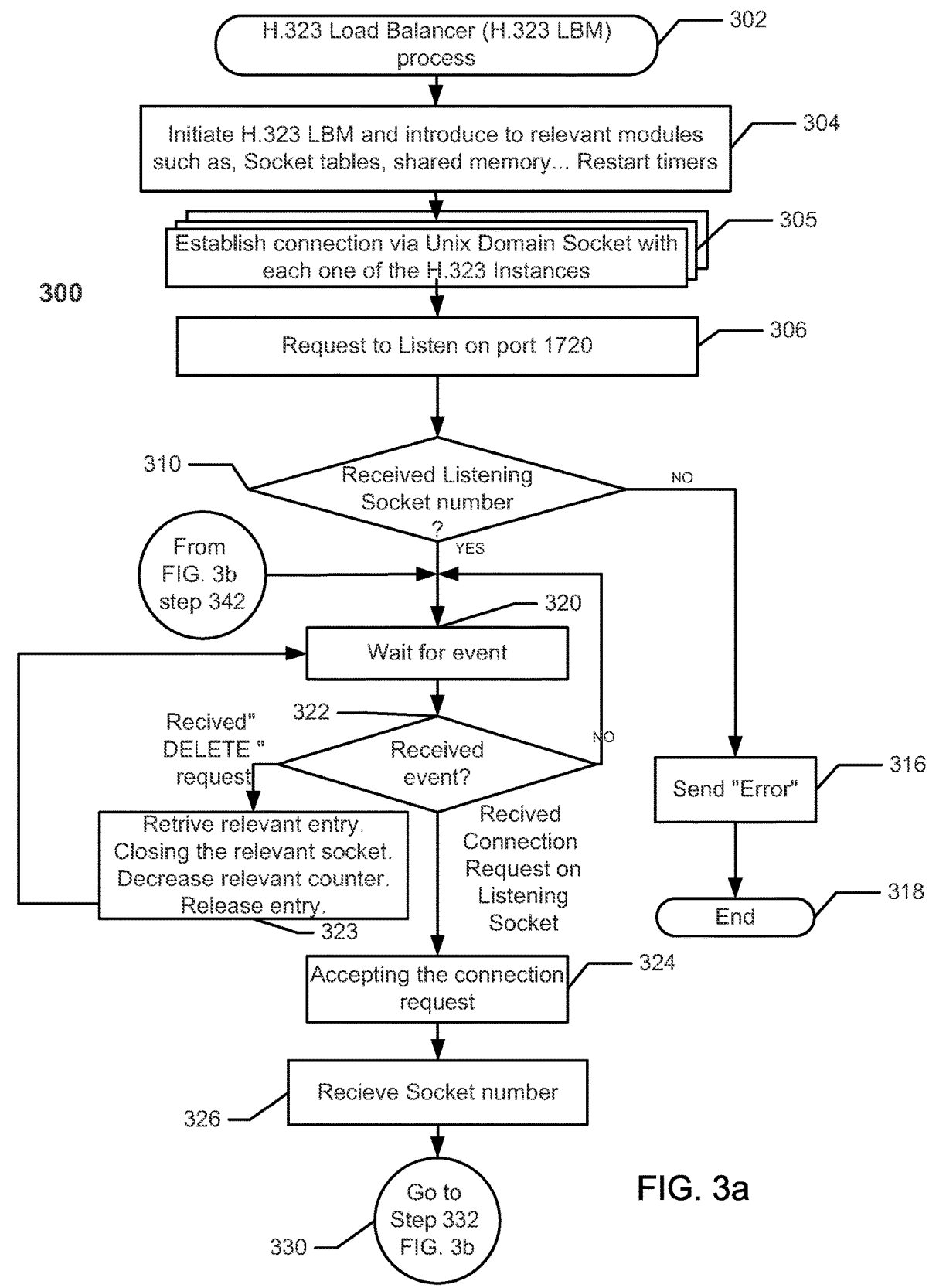
FIG. 3a&b is a flowchart illustrating an exemplary method of H.323 call-setup handling over TCP.

FIG. 3*a&b* illustrate an exemplary method 300 for handling a H.323 call-setup over TCP connection. Method 300 can be implemented by an exemplary embodiment of H.323 LBM 130 (FIG. 1). Method 300 can be initiated 302 during power on of MCU 100 (FIG. 1) and can run as long as the MCU is active. Upon initiation 304, H.323 LBM 130 can be introduced to relevant modules or can initiate modules that are involved in the operation of H.323 LBM 130. Exemplary modules can be the H.323 socket table 135, a set of H.323 instances 140*a-c* (FIG. 1), a set of Active-Call Counters one per each H.323 instances 140*a-c*, etc.

After the initiation processes 302 & 304, an internal connection between H.323 LBM 130 and each one of the H.323 instances 140*a-c* is established 305. The internal connection can be based on file descriptor transferring and/or file descriptor sharing mechanism, such as but not limited to, Unix Domain Socket, for example.

At this point, H.323 LBM 130 can request 306 the OS 120 (FIG. 1) to listen on TCP port 1720. If a listening socket number is not received, then an error message can be sent 316 to the OS 120 and method 300 can be terminated 318.

When a listen socket number is received 310, method 300 starts a loop between steps 320 and 342 (FIG. 3*b*) for handling H.323 communication sessions. At steps 320 and 322 method 300 waits to receive an event. An event can be received from the OS 120 (FIG. 1) or from one of the H.323 instances 140a-c (FIG. 1). If the event received 323 is a DELETE API command via one of the connections that was set in step 305 from one of the instances 140a-c, then a relevant entry from the H.323 socket table is retrieved and parsed. The relevant entry is retrieved based on the entry ID number that can be associated with the API DELETE command. According to the content of the entry, a close-socket request 323 for closing the socket that was allocated to the LBM for handling the relevant session is issued. The Active-Call Counter that was allocated to the relevant instance is decremented by one and the relevant entry in H.323 socket table 135 is released. In response to the close socket command, OS 120 sends a TCP FIN to the relevant client for closing the TCP connection.

Figure 3B:
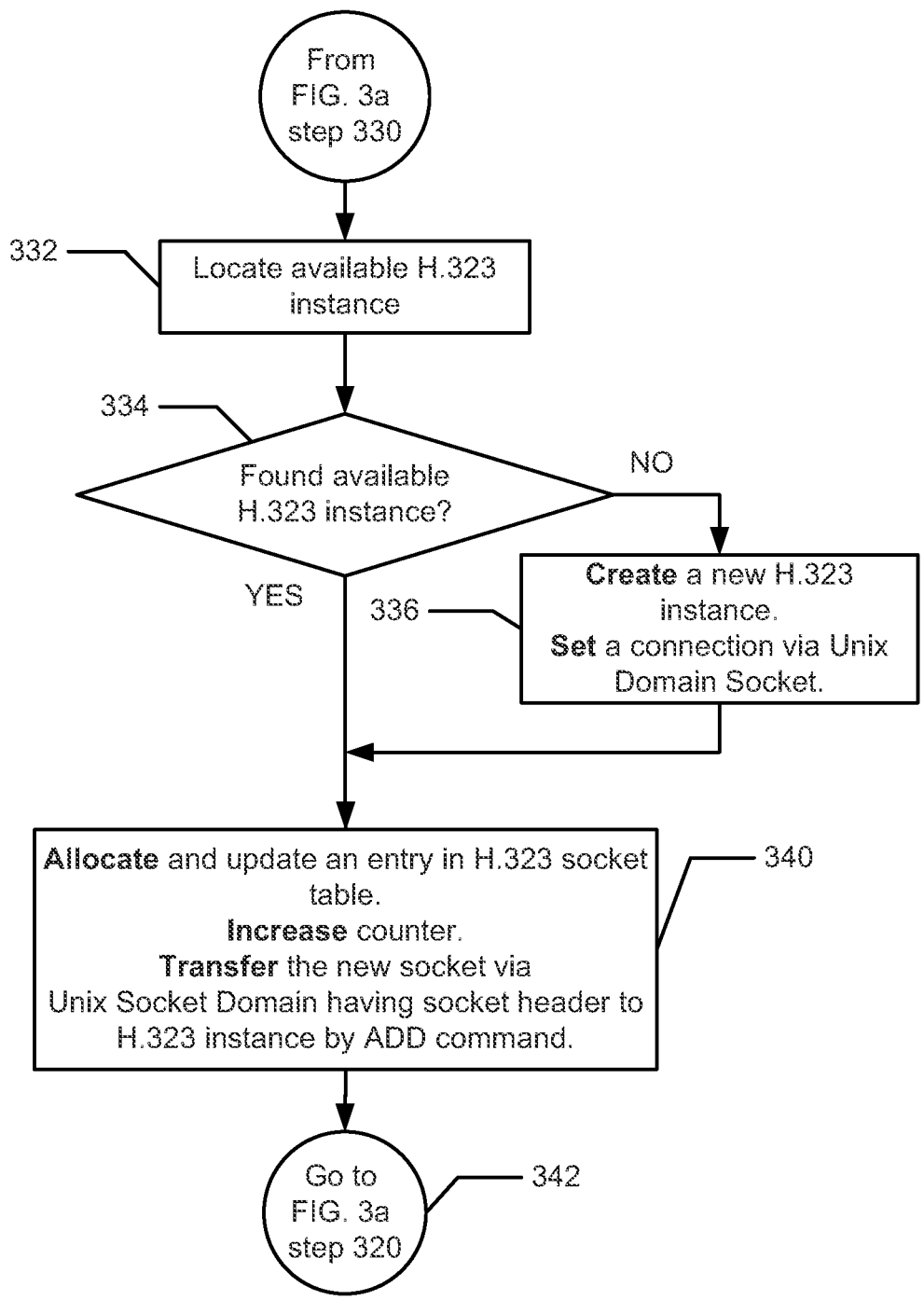

If at 322 the event is received via the listening socket 126, which indicates a new H.323 connection request, then the LBM 130 may accept the new call, which is received via the listening socket 126 (FIG. 1). In response, a new socket number is received 326 for carrying the new H.323 session and method 300 continues 330 to the steps that are illustrated in FIG. 3b. The new socket can be one of the sockets 127a-c (FIG. 1), for example 127a.

At step 332 (FIG. 3b), method 300 may determine which H.323 instance 140a-c is available for handling the call. The decision can be based on checking the Active-Call Counter of each one of the instances and selecting the one with the least number of sessions, for example. If at 334 an available H.323 instance is found, 140a, for example, its associated Active-Call counter is incremented. An entry in the H.323 socket table 135 (FIG. 1) is allocated 340 for the session, the entry is updated with an entry ID, the allocated socket (e.g., 127a), and the selected instance (e.g., 140a). API ADD command is then sent via Unix domain Socket connection to the selected instance. The header of the Unix domain Socket message can indicate that it is a socket transferring message. The content of the message can include the new socket number, 127a, and the entry ID number, for example. In response the selected instance, 140a for example, will get another socket number 127a' to be used for the session. Alternatively, another file descriptor sharing mechanism can be used. At this point 342 method 300 returns to step 320 (FIG. 3a) to wait for the next event.

If at 334 there is no available H.323 instance, then LBM 130 may create 336 a new instance 140d (not shown in the drawing), and set an internal connection with the new instance 140d as was done in step 305 above, and continue to step 340. In an alternative embodiment, if an available instance is not found the call can be rejected.

Figure 4:
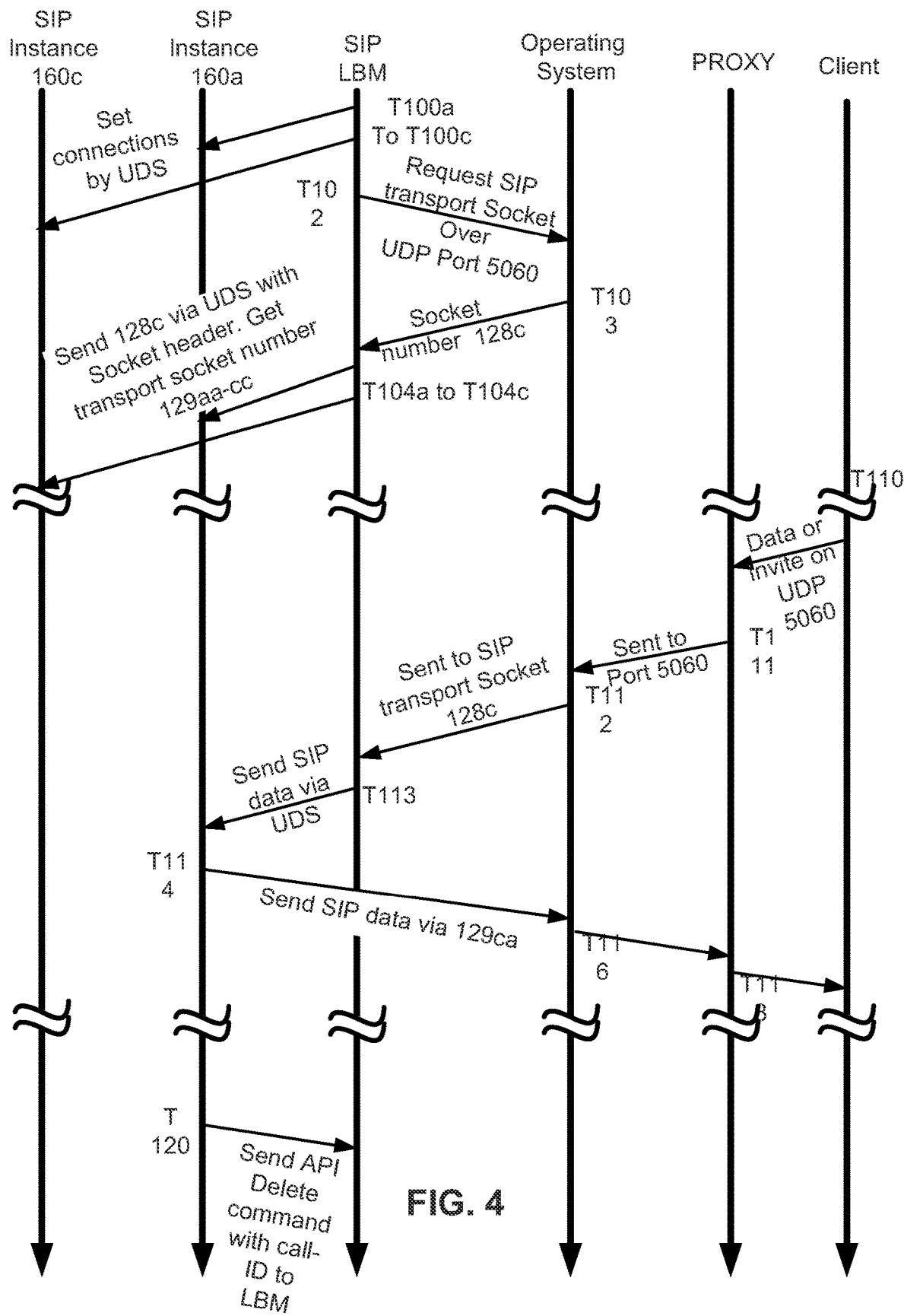
FIG. 4 is a time diagram illustrating an exemplary flow of SIP, based on UDP transport protocol call-setup handling.

FIG. 4 illustrates a time diagram with an exemplary flow of events in a SIP call handling. In the example of FIG. 4, the SIP call is based on UDP transport protocol and is received via UDP port 5060. For convenience and clarity of presentation only a single call via UDP port 5060 with few events is illustrated. However, a skilled person in the art will appreciate that a plurality of calls with a plurality of events can be handled in a similar way. Furthermore, FIG. 4 illustrates the flow of an exemplary embodiment in which the clients are connected via a SIP proxy to the MCU 100 (FIG. 1). In an alternate embodiment, two or more SIP proxies can be used, or alternatively clients can be connected directly to the MCU. In those cases the timing diagram can be modified according to the type of the connections.

At the beginning of the illustrated flow diagram, at T100a to T100c SIP LBM 150 (FIG. 1) establishes connections with each one of the SIP Instances 160a-c (FIG. 1). The connection with the instances can be done by file descriptor transferring mechanism, such as but not limited to, Unix Domain Socket (UDS). After setting the connection with each one of the instances 160a-c, SIP LBM 150 can request, at T102, from OS 120 (FIG. 1) to open a SIP transport socket over UDP port 5060. In return, at T103, OS 120 (FIG. 1) sends a socket number 128c (FIG. 1) to SIP LBM 150 that will serve as the SIP transport Socket (STS) on UDP port 5060 for incoming SIP data.

The socket number 128c is transferred at T104a-T104c via Unix domain Socket connection, established before at T100a-T100c, to each one of the SIP instances 160a-c. The header of the Unix domain Socket message can indicate that it is a socket transferring message. The content of the message can include the SIP transport socket number, 128c, for example. Consequently, each of the SIP instances 160a-c receives another number, 129aa-cc (FIG. 1), to be used as STS through which each SIP instance will send SIP data to the relevant clients via the UDP port 5060 and the SIP proxy.

At T110, a SIP client can send a SIP packet with SIP data or SIP Invite request toward UDP port number 5060. The SIP data is associated with a certain Call-ID (CID), which was allocated by the client that initiated the SIP call. At T111, the proxy transfers the SIP packet to MCU 100 (FIG. 1). OS 120 (FIG. 1), after processing the IP header and the UDP header, transfers at T112 the SIP data to SIP LBM 150 via SIP transport socket 128c. SIP LBM 150 can parse the SIP data by parser 152 (FIG. 1) and determine whether the data is an invite request of a new SIP session or SIP data of an existing SIP session. If it is an existing SIP session, based on the CID of the session, an entry is searched in SIP CID table 153 (FIG. 1). The entry is parsed for identifying the allocated SIP instance 160a-c that handles the session, for example instance 160a. Then, at T113, the SIP data is transferred as a Unix Domain Socket message via the connection that was established during T100a, for example.

If the SIP data includes a SIP invite request, SIP LBM 150 can determine which SIP instance is available, 160a for example. Then an entry is allocated for the session at SIP CID table 153 and the selected instance and the CID of the session are stored in the entry. The Active-Call Counter associated with the selected SIP instance, 160a, is incremented by one. At T113, the SIP invite request is transferred as a Unix Domain Socket message via the connection that was established during T100a with the selected instance, for example. Then at T113 the SIP data is transferred as a Unix Domain Socket message via the connection that was established during T100a with the selected instance, 160a for example.

The selected SIP instance, 160a, may further process the SIP data and, at T114, a SIP response is sent by the appropriate SIP instance (160a, for example) via socket 129ca (the 'c' represent that it is a UDP session received via SIP transport socket 128c, and 'a' represent SIP instance 160a), for example, to the client via the OS 120. At T116, after adding the appropriate UDP and IP headers, the packet is sent to the proxy and from there, at T118, the packet is transferred to the client. The session may proceed in a similar way, until the selected instance, 160a, determines that the received SIP data is a request to terminate the call, or the SIP instance determines to terminate the SIP session. Then at T120 the selected SIP instance, 160a, sends an API DELETE command with the CID of the session to SIP LBM 150. The command is sent as a Unix Domain Socket message via the connection that was established during T100a with the selected instance, 160a for example. Upon receiving the DELETE command with the CID of the terminated call, the relevant entry is searched in the SIP CID table 153 and the entry is released. The Active-Call Counter associated with the selected SIP instance 160*a*, is decremented by one. Since a proxy is involved, the connection with the proxy is not affected by the termination of one call. The connection with the proxy remains active for serving other clients.

A similar flow diagram can be illustrated for a SIP session that is carried over TCP. For a TCP based SIP session the TCP transport module 122*a* will replace the UDP transport module 122*b* (FIG. 1), SIP transport socket 128*b* will replace the SIP transport socket 128*c* and socket 129*ba* will replace the socket 129*ca*. For a TCP and TLS based SIP session the TCP transport module 122*a* will replace the UDP transport module 122*b* (FIG. 1), SIP transport socket 128*a* will replace the SIP transport socket 128*c* and socket 129*aa* will replace the socket 129*ca*. In addition, a decryption process will be added at T113 for decrypting the SIP data before parsing it.

An exemplary embodiment that handles SIP sessions carrying over TCP/IP (port 5060) or TLS/TCP/IP (port 5061) may need to first establish a TCP connection between the MCU and the SIP proxy. In such embodiment, to open a SIP transport Socket for carrying the SIP data over a TCP connection via ports 5060 or 5061, first a listening socket can be opened between the SIP LBM 150 and port 5060 or 5061 to establish the TCP connection between the MCU and the SIP proxy. After establishing the TCP connection, a SIP transport socket 128*a*&*b* may be allocated for handling the SIP data and is transferred to SIP LBM 150. An exemplary process for opening a TCP connection between the MCU and the SIP proxy and allocating the SIP transport socket can be similar to the one that is disclosed in FIG. 2*a* from T1 to T14 (for setting the TCP connection) and T15 (for allocating the SIP transport socket). In TCP based SIP sessions, the TCP connection can remain open as long as the MCU is active.

FIG. 5 illustrates an exemplary method 500 for handling SIP calls over three possible transport protocol options simultaneously: over TCP connection and port 5060, UDP and port 5060, or TCP on port 5061 for encrypted TLS sessions. Method 500 can be implemented by an exemplary embodiment of SIP LBM 150 (FIG. 1). Another exemplary embodiment can be configured to work with a single type of SIP sessions (UDP; or TCP; or TLS/TCP). Yet another exemplary embodiment can be configured with a combination of two types of SIP sessions. In those embodiments, method 500 can be modified to match the used transport protocols.

Method 500 can be initiated 502 during power on of MCU 100 (FIG. 1) and can run as long as the MCU is active. Upon initiation 504, SIP LBM 150 can be introduced to relevant modules of the MCU 100 and can initiate modules that are involved in the operation of SIP LBM 150. Exemplary modules can be the SIP CID table 153, a set of SIP instances 160*a*-*c* (FIG. 1), a set of Active-Call Counters one per each SIP instances 160*a*-*c*, etc.

After the initiation processes 502 & 504, an internal connection between SIP LBM 150 and each one of the SIP instances 160*a*-*c* is established 506. The internal connection can be based on file descriptor transferring and/or file descriptor sharing mechanism, such as but not limited to, Unix Domain Socket, for example.

After setting 506 a connection with each one of SIP instances 160*a*-*c*, SIP LBM 150 can request 508 to open a SIP transport socket over one or more ports, depending on the configuration. The ports can be: TCP port 5060, UDP port 5060 and TCP port 5061. Then, the SIP LBM can wait 510 to receive a SIP transport socket number per each one of the pairs of transport-protocol and a port. If one of the socket numbers was not received, then an error message can be sent 516 to the OS 120 and method 300 can be terminated 518. Exemplary embodiments that use TCP transport protocol for carrying the SIP communication may need to establish first a TCP connection between the MCU and the SIP proxy by opening listening socket over the appropriate port (5060 or 5061 for TLS/TCP) and only after establishing the TCP connection a SIP transport socket can be delivered.

When 510 the appropriate number of SIP transport sockets is received, depending on the configuration of the proxy and the MCU (sockets 128*a* for TLS/TCP on port 5061; and/or 128*b* for TCP on port 5060; and/or 128*c* for UDP on port 5060, for example), then each of the socket numbers (128*a*-*c*) is transferred 520 to each of the SIP instances 160*a*-*c*. Sending the SIP transport socket to each one of the SIP instances can be done as a Unix domain Socket message over the connection that was established during step 506 with each one of the SIP instances. The header of the Unix Domain Socket message can indicate that it is a socket-transferring message. The content of the message can include the transferred socket number, 128*a* or 128*b* or 128*c*. Consequently, the received socket number at each instance will be 129*a*,*a*-*c*; or 129*b*,*a*-*c*; or 129*c*,*a*-*c*, wherein the first letter represents the SIP transport socket and the second letter represents the instance number. Therefore, sockets 129*c*,*a*-*c* represents three sockets: 129*ca* used for sessions received via socket 128*c* to instance 160*a*; 129*cb* used for sessions received via socket 128*c* to instance 160*b*; and 129*cc* used for sessions received via socket 128*c* to instance 160*c* (FIG. 1).

After sending the one or more SIP transport sockets to a SIP instance, the SIP LBM 150 can get a response from the instance with its received socket number. The response is sent as a Unix domain socket message via the connection which was established in step 506. The SIP LBM 150 stores the pair of sockets numbers, in a SIP socket table. An exemplary SIP socket table can includes a matrix in which the rows are associated with the SIP transport sockets 128*a*-*c* and the columns are associated with the SIP instances 160*a*-*c*, for example. In this example, each cell in the matrix will include the socket 129*aa*-*cc* that will be used by the appropriate instance 160*a*-*c*.

At step 522 and 530, method 500 waits to receive an event. An event can be received from the OS 120 (FIG. 1) or from one of the SIP instances 160*a*-*c* (FIG. 1). If the event is received 530 from one of the instances 160*a*-*c*, then a decision is made 536 whether it is a DELETE API command. If 536 it is a DELETE API command received over one of the connections that was set in step 506. The API DELETE commend can point the CID of the session. Based on the session CID the relevant entry from the SIP CID table 153 (FIG. 1) is retrieved 538 and is released. The Active-Call Counter that is associated with the relevant SIP instance is decremented by one and method 500 returns to step 522. If the event is not 536 a DELETE API command, method 500 returns to step 522 to wait for the next event.

If 530 the received event was received from the OS 120 (FIG. 1) over one of the SIP transport sockets, 128*a*-*c* (FIG. 1), then a decision is made 540 whether the session is based on TLS. The decision can be based on the SIP transport socket. If the SIP message was received via socket 128*a*, then the session is an encrypted session based on TLS. Therefore, the message is decrypted 542 by TLS DEC 154

(FIG. 1) and the decrypted message is transferred to parser 152 (FIG. 1) for further analysis 544. If 540 the SIP message is not based on the TLS, the message was received via socket 128b or 128c, then the message is transferred to parser 152 (FIG. 1) for further analysis 544 and method 500 proceed to step 552 in FIG. 5b.

Figure 5A:
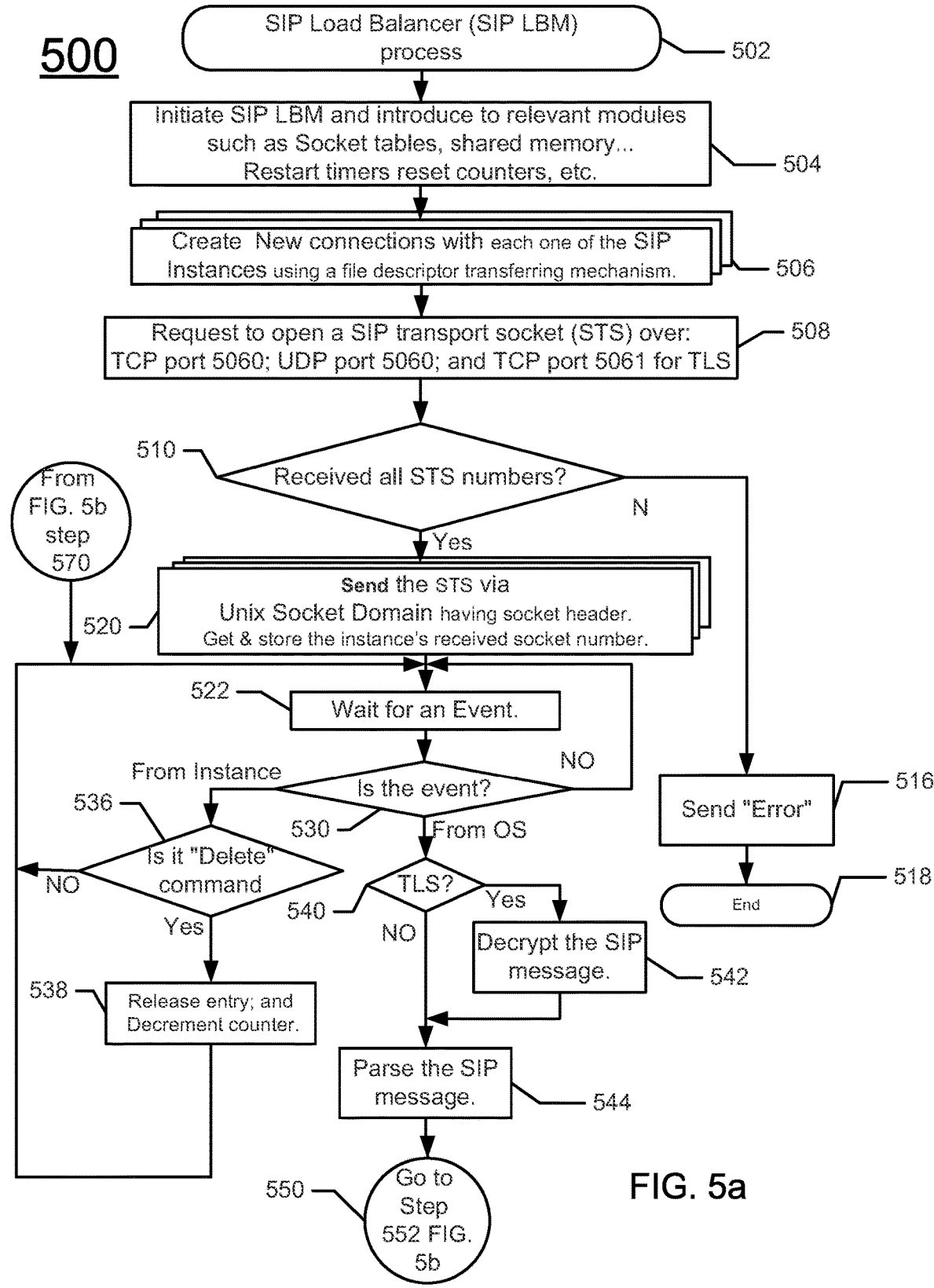
FIG. 5a&b. is a flowchart illustrating an exemplary method of SIP call-setup handling based on UDP transport protocol.
Figure 5B:
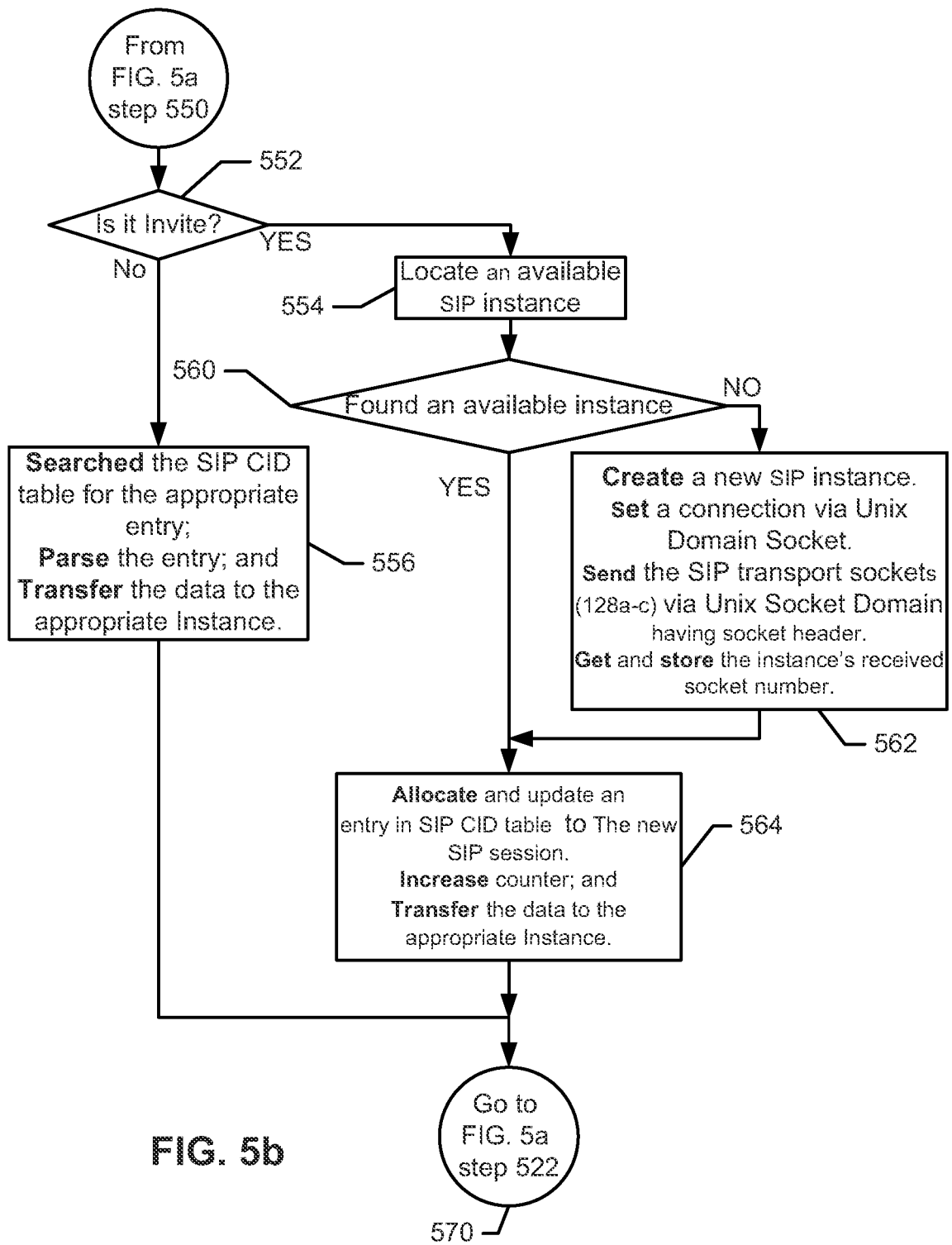

Referring now to FIG. 5b, at step 552 a decision is made whether the analyzed SIP message is an INVITE request from a client. The INVITE request can be sent from a client that would like to start a new SIP session. If 552 yes, then method 500 may search 554 for a SIP instance 160a-c (FIG. 1) that is available for handling the call. The selection can be based on the Active-Call Counter of each one of the instances, looking for the one with the least number of sessions, for example 160a. If 560 an available SIP instance is found, 160a, for example, then an entry in the SIP CID table 153 (FIG. 1) is allocated 564 for the new session. The entry is updated with the CID of the session, the selected instance (for example, 162a) and the relevant socket 129a-c,a to be used by the selected SIP instance, 160a for example. The relevant socket is retrieved from the SIP socket table from the cell that is in the junction of the SIP transport socket 128a-c from which the session received and the selected instance, 160a for example. The Active-Call Counter of the instance is incremented by one, and the received SIP message is sent via the appropriate Unix domain Socket connection, established in step 506 (FIG. 5a) or 562 as described below, to the selected instance. The CID of the session is retrieved from the parsed SIP message. An alternate embodiment may use other file descriptor sharing mechanism instead of Unix domain socket. At this point 570 method 500 returns to step 522 (FIG. 5a) to wait for the next event.

If 560 an available SIP instance was not found, exemplary method 500 can create 562 a new instance. A connection between the SIP LBM and the new SIP instance can be establish in a similar way as the one that is disclosed above in conjunction with step 506 (FIG. 5a). After setting the connection with the new instance, the SIP LBM 150 can send each one of the SIP transport sockets 128a-c to the new SIP instance as it is disclosed above in conjunction with step 520 (FIG. 5a). Furthermore, the SIP LBM can get and store the socket number received by the instance, update the SIP socket table in a similar way to the description of step 520 and continues to step 564.

Returning now to step 552, if the SIP data is not an INVITE request, then the SIP CID is searched 556 for an entry that is associated with the parsed CID. The entry is retrieved and parsed to determine which SIP instance was associated to the session. Then, the SIP data is transferred to the associated SIP session as a UNIX Domain Socket message via the connection that was established in step 506 and method 500 returns 570 to step 522 in FIG. 5a.

The disclosed methods and systems have been described using detailed descriptions of embodiments thereof that are provided by way of example and are not intended to limit the scope of the disclosure. The described embodiments comprise different features, not all of which are required in all embodiments. Some embodiments utilize only some of the features or possible combinations of the features. Variations of embodiments that are described and embodiments comprising different combinations of features noted in the described embodiments will be apparent to persons of skill in the art.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware. Software of a logical module can be embodied on a computer readable medium such as a read/write hard disc, CDROM, Flash memory, ROM, etc. In order to execute a certain task a software program can be loaded to an appropriate processor as needed.

Various changes in the details of the illustrated operational methods are possible without departing from the scope of the following claims. For instance, illustrative processing processes 300 and 500 may perform the identified steps in an order different form that disclosed here. Alternatively, some embodiments may combine the activities described herein as being separate steps. Similarly, one or more of the described steps may be omitted, depending upon the specific operational environment the method is being implemented in. In addition, acts in accordance with FIGS. 1-5 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices, sometimes referred to as computer readable medium, suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

It will be appreciated by persons skilled in the art that the present invention is not limited by what has been particularly shown and described herein above. Rather the scope of the invention is defined by the claims that follow.

I claim:

1. A method of load balancing one or more instances of an application supporting one or more conferences, the method comprising:
   instantiating a first load balancing module using a processing unit;
   instantiating one or more instances of a first application using the processing unit responsive to a request from the first load balancing module, the one or more instances supporting one or more conferences;
   receiving, at the processing unit, a request to establish a connection with a first endpoint;
   selecting, using the first load balancing module, a first instance from the one or more instances of the first application to process data of the first endpoint;
   storing, using the first load balancing module, a first identifier associating the first endpoint with the first instance in a data structure;
   receiving, first data from the first endpoint; and
   transferring the first data to the first instance independently of the first load balancing module based on the first identifier stored by the data structure.

2. The method of claim 1, further comprising increasing a first value of a connection counter associated with the first instance to a second value based on selecting the first instance to process data of the first endpoint.

3. The method of claim 2, wherein the first instance is selected using the first load balancing module to process data of the first endpoint based on the first value of the connection counter.

4. The method of claim 1, wherein the first identifier corresponds to a socket number.

5. The method of claim 1, wherein the first identifier corresponds to a call identifier.

6. The method of claim 1, further comprising:
receiving, at the processing unit, a second request to establish a connection with a second endpoint;
selecting, using the first load balancing module, a second instance from the one or more instances of the first application to process data of the second endpoint;
storing, using the first load balancing module, a second identifier associating the second endpoint with the second instance in the data structure;
receiving, second data from the second endpoint; and
transferring the second data to the second instance independently of the first load balancing module based on the second identifier stored in the data structure, wherein the first data and the second data are received via a single internet protocol port.

7. The method of claim 1, further comprising:
instantiating a second load balancing module on the processing unit;
instantiating one or more instances of a second application on the processing unit responsive to a request from the second load balancing module, the one or more instances supporting one or more conferences;
receiving, at the processing unit, a second request to establish a connection with a second endpoint;
selecting a second instance from one or more instances of a second application to process data of the second endpoint;
storing, using a second load balancing module, a second identifier associating the second endpoint with the second instance in a second data structure;
receiving, a second data from the second endpoint; and
transferring the second data to the second instance independently of the second load balancing module based on the second identifier, wherein the first data is received via a first internet protocol port and the second data is received via a second internet protocol port.

8. A non-transitory computer-readable storage device storing instructions, the instructions executable by one or more processors to:
instantiate a first load balancing module;
instantiate one or more instances of a first application responsive to a request from the first load balancing module, the one or more instances supporting one or more conferences;
receive a request to establish a connection with a first endpoint;
select, using the first load balancing module, a first instance from the one or more instances of the first application to process data of the first endpoint;
store, by the first load balancing module, a first identifier associating the first endpoint with the first instance in a data structure;
receive, first data from the first endpoint; and
transfer the first data to the first instance independently of the first load balancing module based on the first identifier stored by the data structure.

9. The non-transitory computer-readable storage device of claim 8, wherein the instructions are further executable by the one or more processors to increase a first value of a connection counter associated with the first instance to a second value based on selecting the first instance to process data of the first endpoint.

10. The non-transitory computer-readable storage device of claim 9, wherein the first instance is selected using the first load balancing module to process data of the first endpoint based on the first value of the connection counter.

11. The non-transitory computer-readable storage device of claim 8, wherein the first identifier corresponds to a socket number.

12. The non-transitory computer-readable storage device of claim 8, wherein the first identifier corresponds to a call identifier.

13. The non-transitory computer-readable storage device of claim 8, wherein the instructions are further executable by the one or more processors to:
receive a second request to establish a connection with a second endpoint;
select, using the first load balancing module, a second instance from the one or more instances of the first application to process data of the second endpoint;
store, using the first load balancing module, a second identifier associating the second endpoint with the second instance in the data structure;
receive, second data from the second endpoint; and
transfer the second data to the second instance independently of the first load balancing module based on the second identifier stored in the data structure, wherein the first data and the second data are received via a single internet protocol port.

14. The non-transitory computer-readable storage device of claim 8, wherein the instructions are further executable by the one or more processors to:
instantiate a second load balancing module;
instantiate one or more instances of a second application responsive to a request from the second load balancing module, the one or more instances supporting one or more conferences;
receive a second request to establish a connection with a second endpoint;
select a second instance from one or more instances of a second application to process data of the second endpoint;
store, using a second load balancing module, a second identifier associating the second endpoint with the second instance in a second data structure;
receive, second data from the second endpoint; and
transfer the second data to the second instance independently of the second load balancing module based on the second identifier stored in the second data structure, wherein the first data is received via a first internet protocol port and the second data is received via a second internet protocol port.

15. An apparatus comprising:
one or more processors; and
a memory storing instructions executable by the one or more processors to:
instantiate a first load balancing module;
instantiate one or more instances of a first application responsive to a request from the first load balancing module, the one or more instances supporting one or more conferences;
receive a request to establish a connection with a first endpoint;

select, using the first load balancing module, a first instance from the one or more instances of the first application to process data of the first endpoint;

store, using the first load balancing module, a first identifier associating the first endpoint with the first instance in a data structure;

receive, first data from the first endpoint; and transfer the first data to the first instance independently of the first load balancing module based on the first identifier stored by the data structure.

16. The apparatus of claim 15, wherein the instructions are further executable by the one or more processors to increase a first value of a connection counter associated with the first instance to a second value based on selecting the first instance to process data of the first endpoint.

17. The apparatus of claim 16, wherein the first instance is selected using the first load balancing module to process data of the first endpoint based on the first value of the connection counter.

18. The apparatus of claim 15, wherein the first identifier corresponds to a socket number.

19. The apparatus of claim 15, wherein the first identifier corresponds to a call identifier.

20. The apparatus of claim 15, wherein the instructions are further executable by the one or more processors to:

receive a second request to establish a connection with a second endpoint;

select, using the first load balancing module, a second instance from the one or more instances of the first application to process data of the second endpoint;

store, using the first load balancing module, a second identifier associating the second endpoint with the second instance in the data structure;

receive, second data from the second endpoint; and transfer the second data to the second instance independently of the first load balancing module based on the second identifier stored in the data structure, wherein the first data and the second data are received via a single internet protocol port.

* * * * *